(12) United States Patent
Varkey et al.

(10) Patent No.: US 10,472,910 B2
(45) Date of Patent: Nov. 12, 2019

(54) SYSTEMS AND METHODS FOR HOLDING WIRELINE DEVICE AGAINST WELL

(71) Applicant: Schlumberger Technology Corporation, Sugar Land, TX (US)

(72) Inventors: Joseph Varkey, Sugar Land, TX (US); Maria Grisanti, Missouri City, TX (US); Paul Wanjau, Missouri City, TX (US); David Kim, Katy, TX (US); William Brian Underhill, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 154 days.

(21) Appl. No.: 15/392,193

(22) Filed: Dec. 28, 2016

(65) Prior Publication Data

US 2018/0179840 A1  Jun. 28, 2018

(51) Int. Cl.
| | |
|---|---|
| *E21B 23/01* | (2006.01) |
| *E21B 47/09* | (2012.01) |
| *E21B 49/00* | (2006.01) |
| *E21B 23/00* | (2006.01) |

(52) U.S. Cl.
CPC .............. *E21B 23/01* (2013.01); *E21B 47/09* (2013.01); *E21B 49/00* (2013.01); *E21B 2023/008* (2013.01)

(58) Field of Classification Search
CPC .... E21B 23/01; E21B 47/09; E21B 2023/008; E21B 49/00
See application file for complete search history.

(56) References Cited

U.S. PATENT DOCUMENTS

| | | | | |
|---|---|---|---|---|
| 3,233,170 A | * | 2/1966 | Rogers | E21B 47/09 324/226 |
| 4,515,010 A | * | 5/1985 | Weido | E21B 47/09 166/255.1 |
| 5,259,452 A | * | 11/1993 | Wittrisch | E21B 23/01 166/250.01 |
| 2014/0191762 A1 | * | 7/2014 | Chen | G01V 3/24 324/355 |
| 2016/0215579 A1 | * | 7/2016 | Van Der Ende | E21B 23/14 |
| 2017/0285208 A1 | * | 10/2017 | Castillo | G01V 3/08 |

* cited by examiner

*Primary Examiner* — Michael R Wills, III
(74) *Attorney, Agent, or Firm* — Eileen Pape

(57) ABSTRACT

A system includes a cable and a toolstring. The toolstring may couple to the cable to enable the toolstring to be placed in a wellbore. The toolstring includes a sensor that can collect measurements relating to the wellbore. An electromagnetic or anchoring device may selectively hold the toolstring or the cable against a surface of the wellbore.

11 Claims, 16 Drawing Sheets

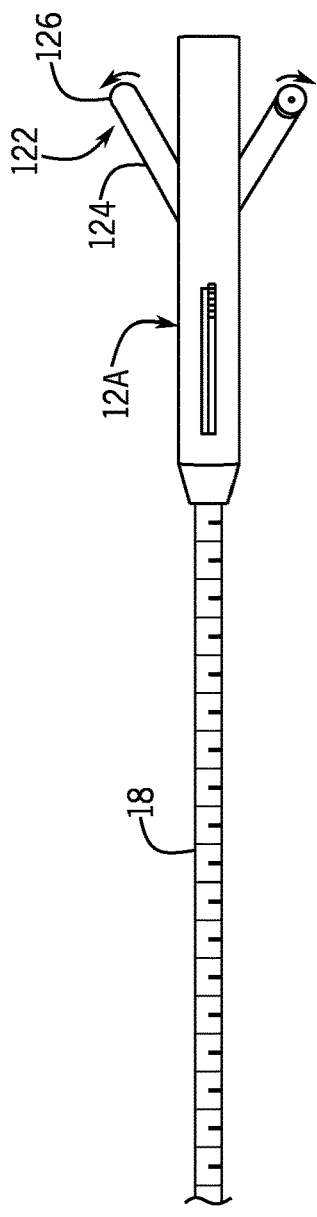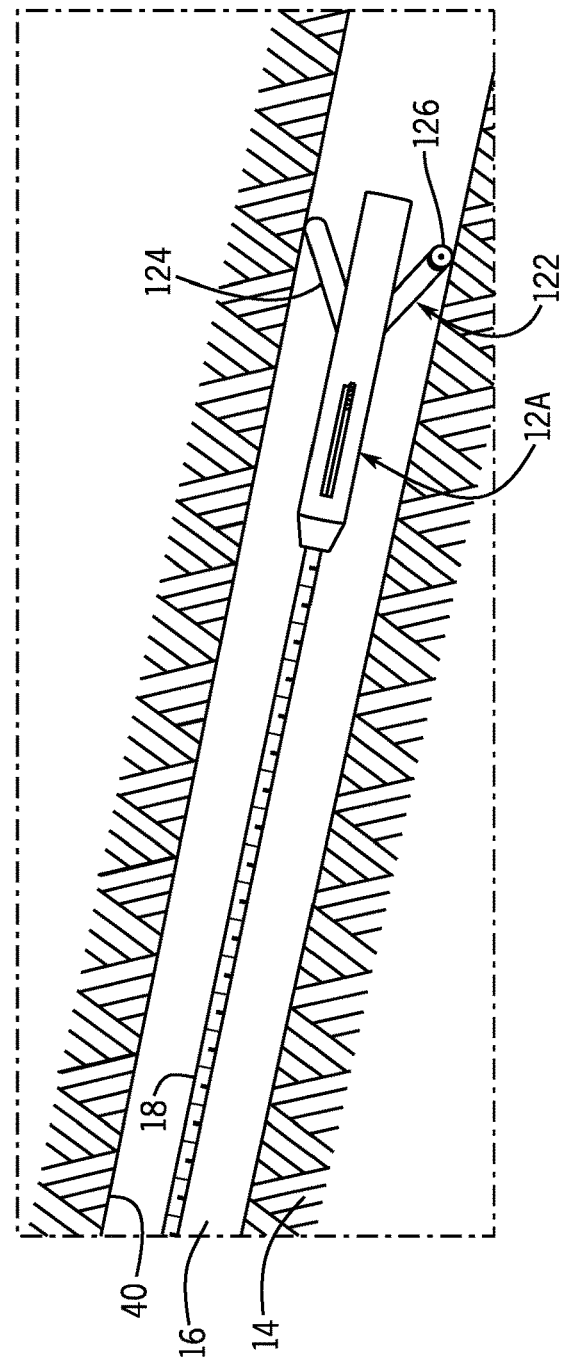

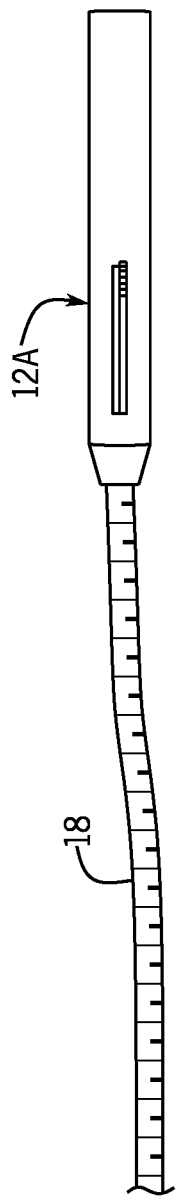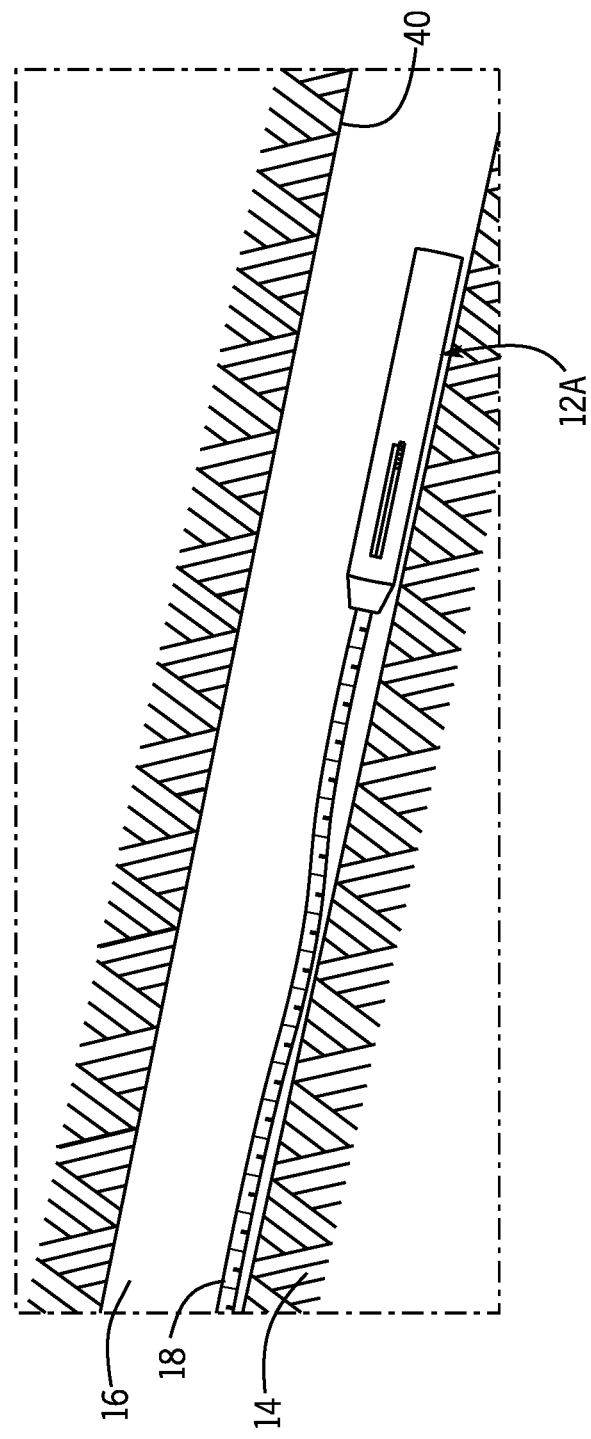

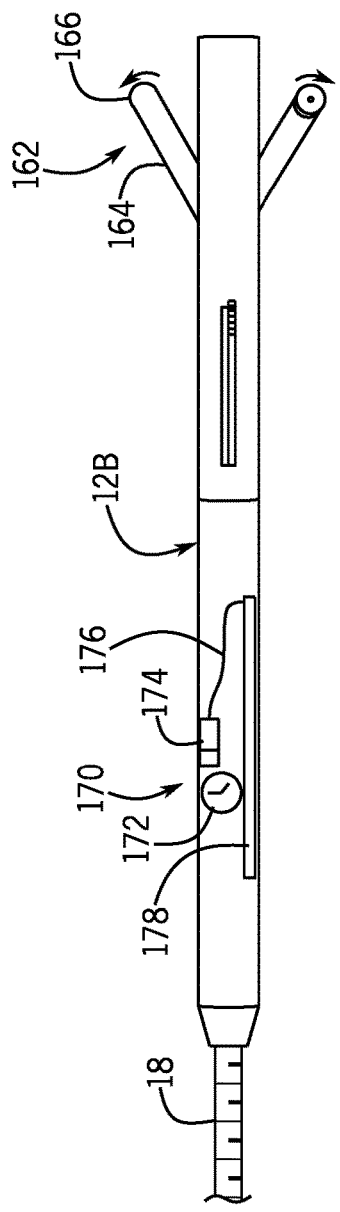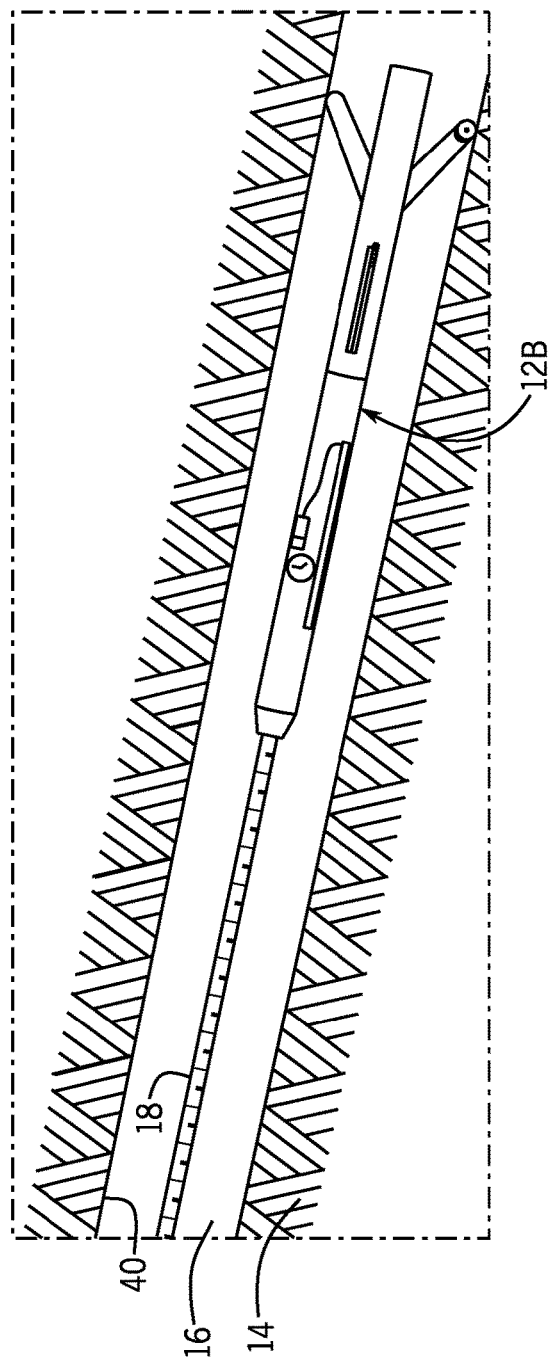

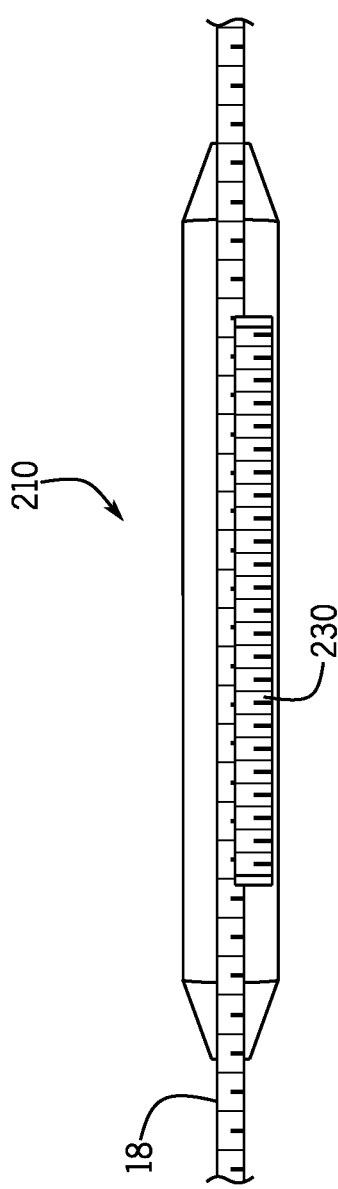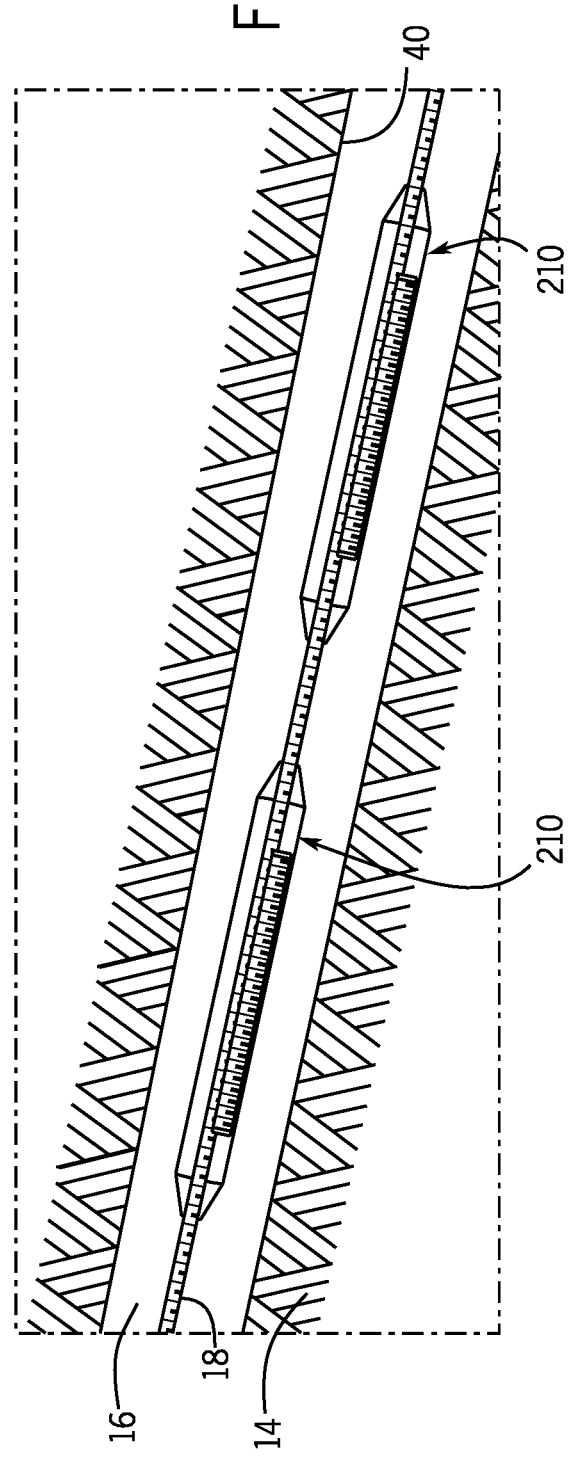

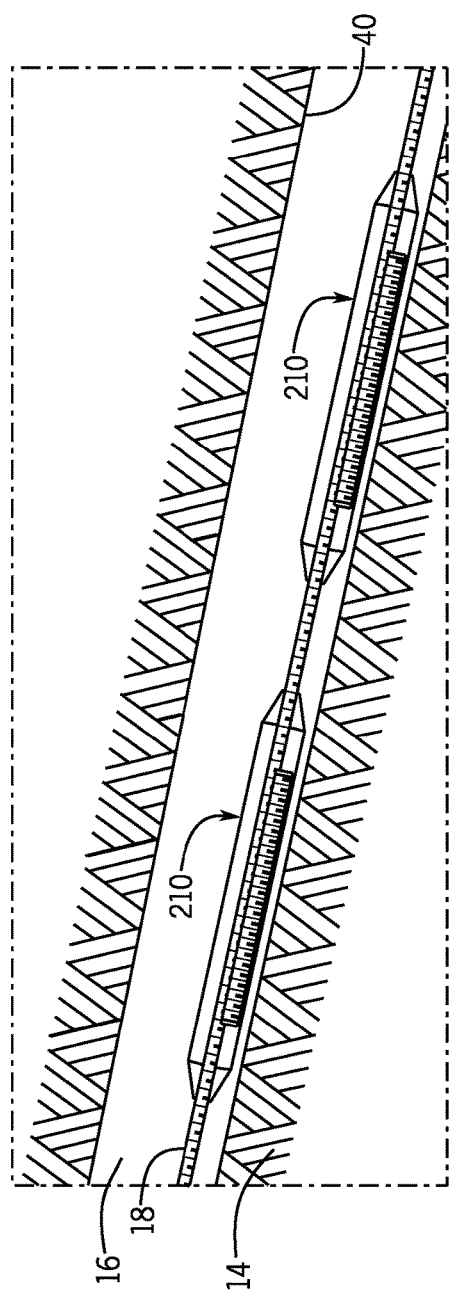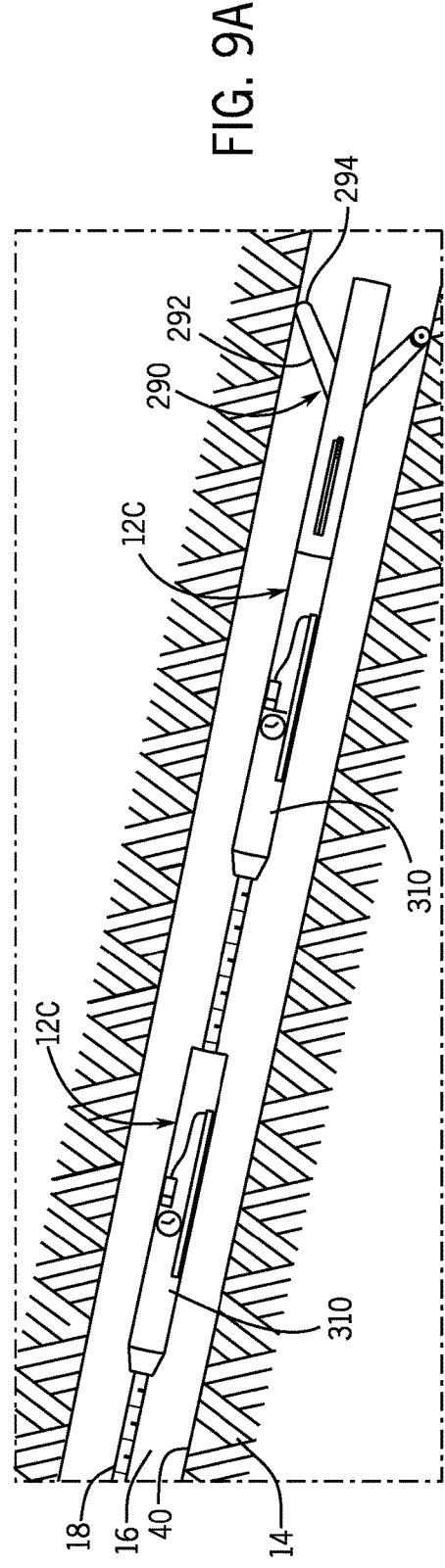

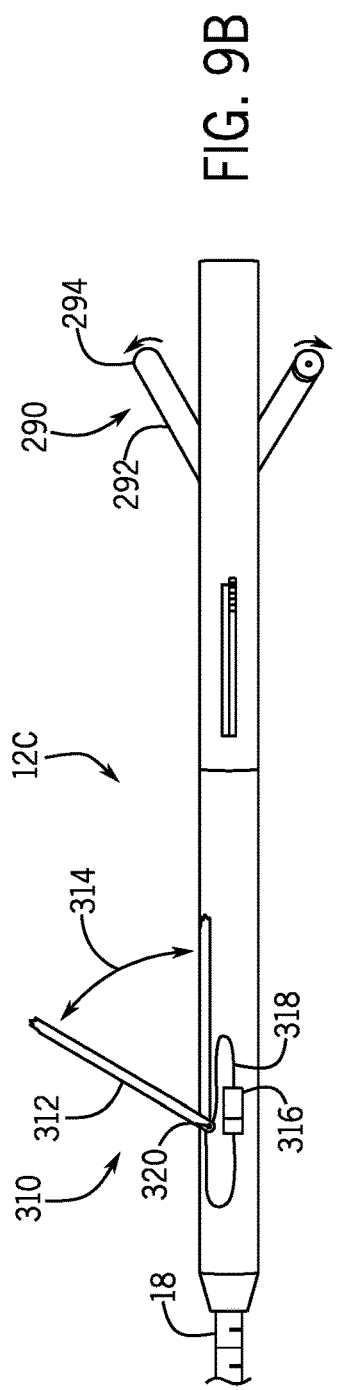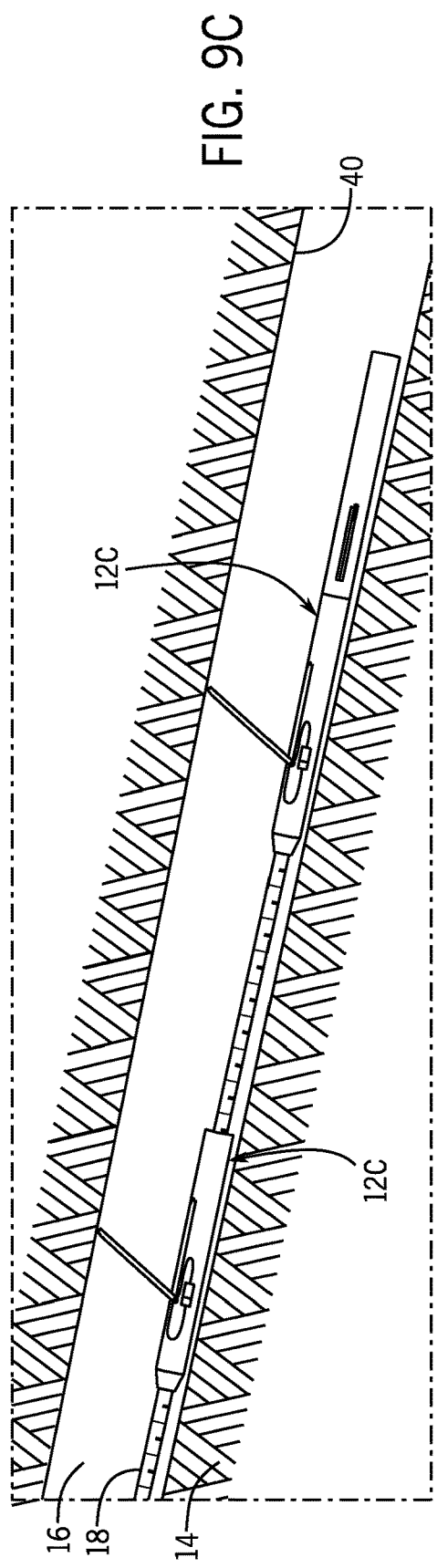

SYSTEMS AND METHODS FOR HOLDING WIRELINE DEVICE AGAINST WELL

BACKGROUND

This disclosure relates to systems and methods to hold a downhole device (e.g., a cable or toolstring) against a wellbore wall, which may improve a signal to noise ratio of wellbore measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of any kind.

To locate and extract resources from a well, a wellbore may be drilled into a geological formation. Some wellbores may change direction at some point downhole. The change in direction may be at an angle as high as ninety degrees with respect to the surface, causing the wellbore to become horizontal. Downhole toolstrings and sensors are placed into the wellbore to identify properties of the downhole environment. In vertical portions of the wellbore, the downhole toolstrings and sensors may descend into the wellbore using only the force of gravity. However, the downhole toolstrings and sensors may descend into angled portions of the well through the use of additional forces other than gravity. As the wellbore approaches a more horizontal angle, the additional forces play a greater role in propelling the downhole toolstrings and sensors deeper into the wellbore. Once the downhole toolstrings and sensors reach the desired location within the wellbore, the sensors are used to gather data about the geological formation. However, this movement of the toolstrings and sensors may worsen the signal to noise ratio, which could lead to less accurate measurements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a system includes a cable, a toolstring, and a device. The toolstring may couple to the cable to enable the toolstring to be placed in a wellbore. Further, the toolstring includes sensors configured to collect data of a geological formation. The device may selectively hold the toolstring against a surface of the wellbore.

In another example, a cable system includes a cable core that includes fiber optic cables, multiple strength members outside of the cable core, and multiple magnetic strength members outside of the cable core. The multiple magnetic strength members may selectively carry current, and the multiple magnetic strength members may become magnetic or activate an electromagnet electrically coupled to the multiple magnetic strength members when the multiple magnetic strength members carry current.

In yet another example, a method for improving the signal to noise ratio, includes lowering a cable and a toolstring into a wellbore. The method includes extending at least one arm of a tractor device coupled to the toolstring, and the at least one arm includes a wheel. The method includes engaging the wheel of the tractor device against a surface of the wellbore, and engaging the wheel of the tractor device propels the toolstring and the cable into the wellbore. The method includes retracting the at least one arm of the tractor device, and retracting the at least one arm disengages the wheel from the surface of the wellbore. The method includes attaching the toolstring to the surface of the wellbore using a device coupled to the toolstring.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3A is a side view of an embodiment of a toolstring with the arms of a tractor device extended, in accordance with an aspect of the present disclosure;

FIG. 3B is a side view of the toolstring of FIG. 3A in a wellbore, in accordance with an aspect of the present disclosure;

FIG. 3C is a side view of the toolstring of FIG. 3A with the cable magnetized and the arms of the tractor device retracted, in accordance with an aspect of the present disclosure;

FIG. 3D is a side view of the toolstring of FIG. 3C in a wellbore and with the cable magnetized and held to the casing of the wellbore, in accordance with an aspect of the present disclosure;

FIG. 5A is a side view of an embodiment of a toolstring including a timer-activated magnetic device with the arms of the tractor device extended, in accordance with an aspect of the present disclosure;

FIG. 5B is a side view of the toolstring of FIG. 5A in a wellbore, in accordance with an aspect of the present disclosure;

FIG. 8A is a side view of an embodiment of the magnetic device, in accordance with an aspect of the present disclosure;

FIG. 8B is a side view of multiple magnetic devices of FIG. 8A in a wellbore, in accordance with an aspect of the present disclosure;

FIG. 8C is a side view of the magnetic devices of FIG. 8B attached to the casing of the wellbore, in accordance with an aspect of the present disclosure;

FIG. 9A is a side view of an embodiment of the toolstring including an anchoring device and a tractor device and the arms of the tractor device are extended, in accordance with an aspect of the present disclosure;

FIG. 9B is a side view of the toolstring of FIG. 9A and the side-arm of the anchoring device extended, in accordance with an aspect of the present disclosure;

FIG. 9C is a side view of multiple toolstring of FIG. 9B with the arms of the tractor devices retracted and the side-arms of the anchoring devices extended and holding the toolstrings against the casing of the wellbore, in accordance with an aspect of the present disclosure;

DETAILED DESCRIPTION

Figure 1:
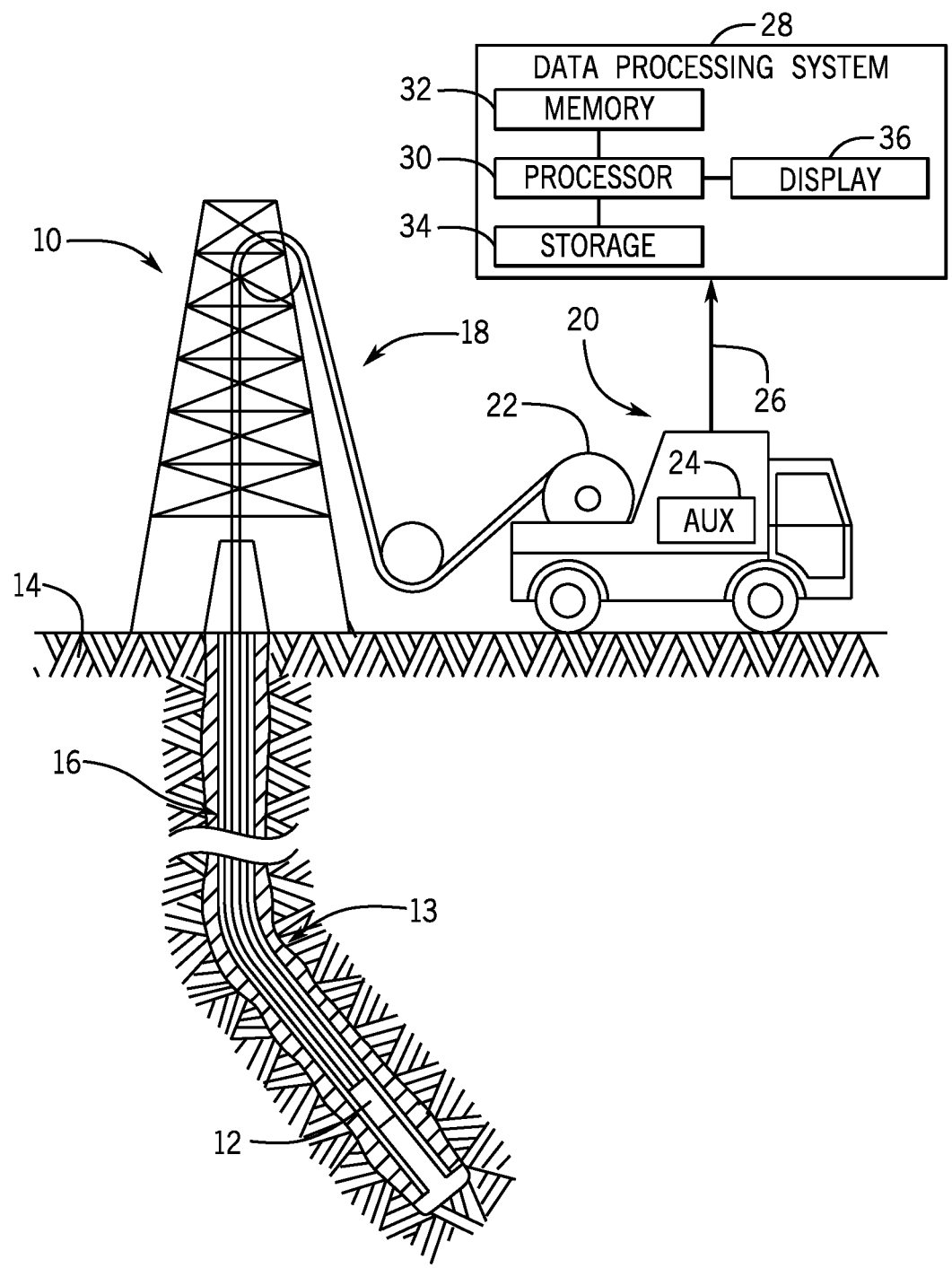
FIG. 1 is a schematic diagram of a wireline system that includes a toolstring to detect properties of a wellbore or geological formation adjacent to the toolstring, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to devices that improve the signal to noise ratio of sensors in a wellbore. Toolstrings containing sensors may be placed into the wellbore to gather information about the geological formation. In some portions of the wellbore, the tool may require forces in addition to gravity to descend further into the well. Once the tool has reached the desired location in the wellbore, the sensors may gather data about the geological formation. When the sensors are gathering data, movement of the sensors may worsen the signal to noise ratio. Therefore, it is desirable to keep the sensors as steady as is possible when the sensors are gathering data.

Accordingly, embodiments of this disclosure relate to a system and method for propelling the toolstring further into the wellbore and for holding the toolstring in a steady position once the toolstring has reached the desired location. That is, some embodiments include a tractor device that includes extendable arms. The arms include drive wheels that may engage the surface of the casing of the wellbore and propel the toolstring further into the wellbore. Some embodiments include a device that may hold the toolstring steady at the desired location in the wellbore. The device may include components within a cable that can be selectively magnetized. When the components are activated and the components becomes magnetized, the cable may attach to the casing of the wellbore. Attaching the cable to the casing of the wellbore may hold the toolstring steady in place. Alternatively, the device may include components within the toolstring that can be selectively magnetized. When the components are activated and the components become magnetized, the toolstring may attach and hold steady against the casing of the wellbore. Alternatively, the device may include components that mechanically hold the toolstring against the casing of the wellbore. The components may include an arm that braces the toolstring against the casing of the wellbore. Further, the device may include multiple devices spread out along the cable.

With this in mind, FIG. 1 illustrates a well-logging system 10 that may employ the systems and methods of this disclosure. The well-logging system 10 may be used to convey a toolstring 12 through a geological formation 14 via a wellbore 16. Further, the wellbore 16 may not continue straight down into the geological formation 14, and the wellbore 16 may contain a turn 13. The wellbore 16 may continue past the turn into the geological formation 14 at an angle as high as ninety degrees. In the example of FIG. 1, the toolstring 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20, the cable 18, and/or the toolstring 12.

Moreover, while the toolstring 12 is described as a wireline toolstring, it should be appreciated that any suitable conveyance may be used. For example, the toolstring 12 may instead be conveyed as a logging-while-drilling (LWD) tool as part of a bottom hole assembly (BHA) of a drill string, conveyed on a slickline or via coiled tubing, and so forth. For the purposes of this disclosure, the toolstring 12 may include any suitable measurement tool that uses a sensor to obtain measurements of properties of the geological formation 14. The toolstring 12 may use any suitable sensors to obtain any suitable measurement, including resistivity measurements, electromagnetic measurements, radiation-based (e.g., neutron, gamma-ray, or x-ray) measurements, acoustic measurements, and so forth. In general, the toolstring 12 may obtain better measurements, having a higher signal-to-noise ration, when the toolstring 12 is pressed against the wellbore 16 wall. In some cases, the toolstring 12 may use fiber optic sensors that obtain wellbore measurements that are greatly improved when the toolstring 12 is pressed against the wellbore 16 wall. Furthermore, when the cable 18 includes fiber optic cables, the signal that is transported over the fiber optic cables may be improved when the cable is generally held taut (rather than, for example, including many turns or kinks that could degrade the signal traveling over the fiber optic cable).

The toolstring 12 may emit energy into the geological formation 14, which may enable measurements to be obtained by the toolstring 12 as data 26 relating to the wellbore 16 and/or the geological formation 14. When collecting the data 26, it is desirable to keep the toolstring 12 as steady as possible in order to improve the signal to noise ratio. Improving the signal to noise ratio allows for more accurate readings. The data 26 may be sent to a data processing system 28. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20 (e.g., within the toolstring 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2A:
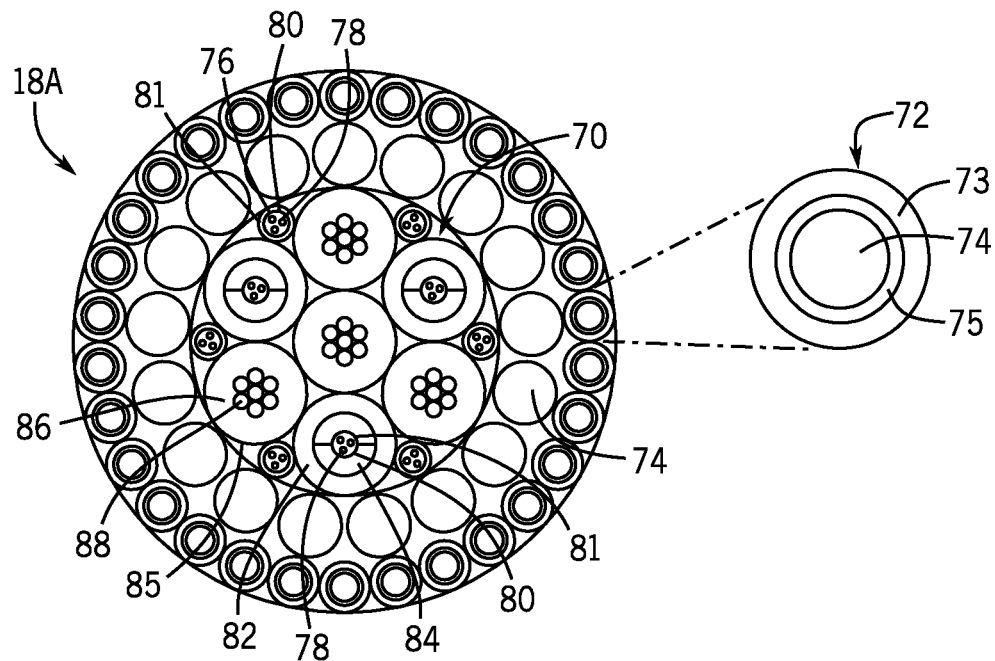
FIGS. 2A and 2B are cross sections of different embodiments of a cable that can be magnetized, in accordance with an aspect of the present disclosure.

FIG. 2A depicts an embodiment of a cross-section of a cable 18A. The present embodiment of the cable 18A allows the cable 18A to magnetically attach to the casing 40 of the wellbore 16. In doing so, the cable 18A holds the toolstring 12 in substantially the same place. In FIG. 2A, the cable 18A is designed to function as an electromagnet. The cable 18A includes three different sections, a cable core 70, strength members 74, and magnetic strength members 72. The cable core 70 may include fiber optic cables 81 and conductors 85. The fiber optic cables 81 may include different configurations. For example, the fiber optic cable 81 may include an optical core 78 and an insulating coating 80 followed by a second insulating coating 76. Alternatively, the second insulating coating 76 may be replaced by spacers 84 followed by an insulating layer 82. While the present embodiment includes three optical cores 78 per fiber optic cable 81, it should be appreciated that each fiber optic cable 81 may include any suitable number of optical cores, including 1, 2, 3, 4, 5, or 6, or more. The conductors 85 include conducting elements 88 surrounded by an insulating material 86. Further, the cable core 70 may be any configuration used for an electro-optical cable (e.g., Coaxial, Triad, Quad, or Hepta). The magnetic strength members 72 include the strength member 74 followed by a layer of insulated strength members/conductors 75 (e.g., using bimetallic materials) followed by a layer of durable polymeric electrical insulation 73. In the present embodiment, the magnetic strength members 72 are disposed further from the cable core 70 than the strength members 74; however, it should be appreciated that the magnetic strength members 72 may be disposed closer to the cable core 70 than strength members 74. Additionally or alternatively, the magnetic strength members 72 may be disposed in a mixed configuration with the strength member 74, with some magnetic strength members 72 further from the cable core 70 and some closer to the cable core 70 than the strength members 74. Each of the strength members 74 or a portion of the strength members 74 in the armor matrix can be magnetic strength members 72. The quantity, material, size and lay angles of the magnetic strength members 72 combined with the electrical current applied can be altered to create an electromagnet of sufficient strength to hold the cable 18A in place against the casing 40 of the wellbore 16. Surface and downhole electronics may be configured to turn the magnetic strength members 72 on and off. In the "Off" mode, return current is carried by the strength members 74. In the "On" position, current is returned on the magnetic strength members 72 and cause the magnetic strength member 72 to function as an electromagnet. In multiple-conductor cable cores, one or more conductors can be replaced with hybrid conductors. A hybrid conductor is a cable that contains multiple strands wrapped around one another, and the strands may be composed of multiple types of metals (e.g., steel, bimetallic, etc.).

Figure 2B:
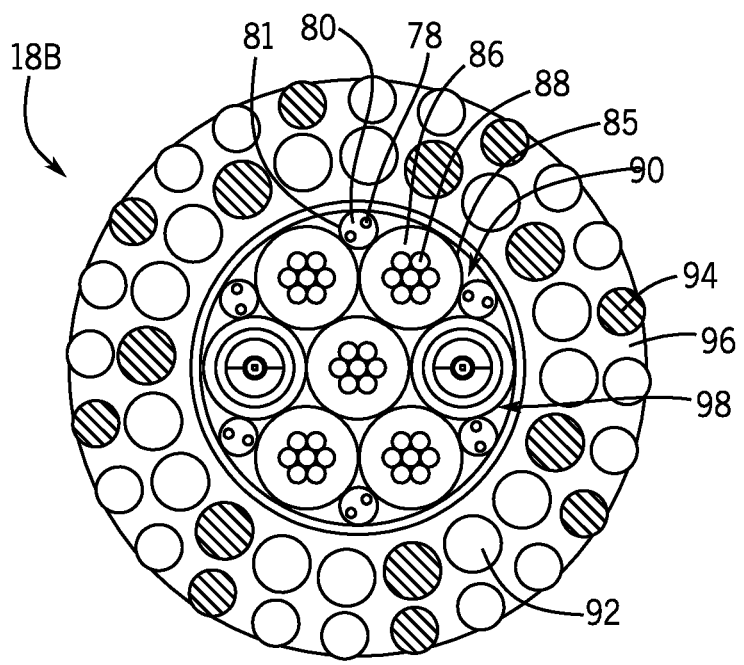

FIG. 2B depicts a cross-section of an alternative embodiment of the cable 18. A cable 18B is designed to function as an electromagnet, and the cable 18B includes a cable core 90, strength members 92, and magnetic strength members 94. The strength members 92 may be magnetic strength members 94. The cable core 90 includes fiber optic cables 81, conductors 85, and wires 98. The fiber optic cables 81 include the optical cores 78 followed by the insulating coating 80. The conductors 85 include conducting elements 88 surrounded by an insulating material 86. The cable core 90 may be any configuration used for an electro-optical cable (e.g., Coaxial, Triad, Quad, or Hepta). All the strength members 92 or a portion of the strength members 92 may be replaced with magnetic strength members 94 (e.g. bi-metallic) in order to balance the cable 18B safe working load and magnetic anchoring force. The material, quantity, size and lay angles of magnetic strength members 94 and the electrical current applied may be configured to create an electromagnet of sufficient strength to hold the cable 18B in place against the casing 40 of the wellbore 16. Strength member 92 and magnetic strength members 94 may be held in place by a filler material 96. The filler material may include insulating elements. Surface and downhole electronics are configured to turn the electromagnet on and off. In the "Off" mode, return current is carried by conductors in the cable core 90. In the "On" position, current is returned on the magnetic strength members 94 causing the magnetic strength members 94 to function as an electromagnet. In multiple-conductor cable cores, one or more conductors can be replaced with hybrid conductors.

FIG. 3A is a side view of an embodiment of a toolstring 12A attached to the cable 18. The cable 18 may be either embodiment depicted in FIGS. 2A and 2B. In the present embodiment, the toolstring 12A includes a tractor device 122. The tractor device 122 includes arms 124, and each arm 124 includes a drive wheel 126. The tractor device 122 may include any suitable number of arms 124, including 1, 2, 3, 4, 5, 6, or more. In operation, the cable 18 and the toolstring 12A are lowered into the wellbore 16 on the cable 18, initially by gravity. The tractor device 122 attached to the toolstring 12A is used to continue propelling the toolstring 12A into the hole of the wellbore 16 in substantially horizontal (i.e., greater than sixty degrees with respect to the surface of the ground) portions of the wellbore 16. As depicted in FIG. 3B, the tractor device 122 uses drive wheels 126 on arms 124 that extend from the toolstring 12A to propel the toolstring 12A down the casing 40 of the wellbore 16.

FIGS. 3C and 3D are side views of the toolstring 12A with the arms 124 of the tractor device 122 retracted and the cable 18 in the "On" position. Once the cable 18 and toolstring 12A are in the desired location, the arms 124 on the tractor device 122 are withdrawn and the cable 18 is turned to the "On" position. The return current is switched to the magnetic strength members 72 or 94. Applying electrical current to the magnetic strength members 72 or 94 allows the cable 18 to function as an electromagnet. The strength of the electromagnet may be adjusted by changing amount of current applied or by adjusting the material, quantity, diameters and lay angles of the insulated strength member/conductors. Further, the magnetic strength members 72 and 94 may be included on a portion of the cable 18. For example, the magnetic strength members 72 and 94 may be included on a portion of the cable 18 near the toolstring 12.

Figure 4:
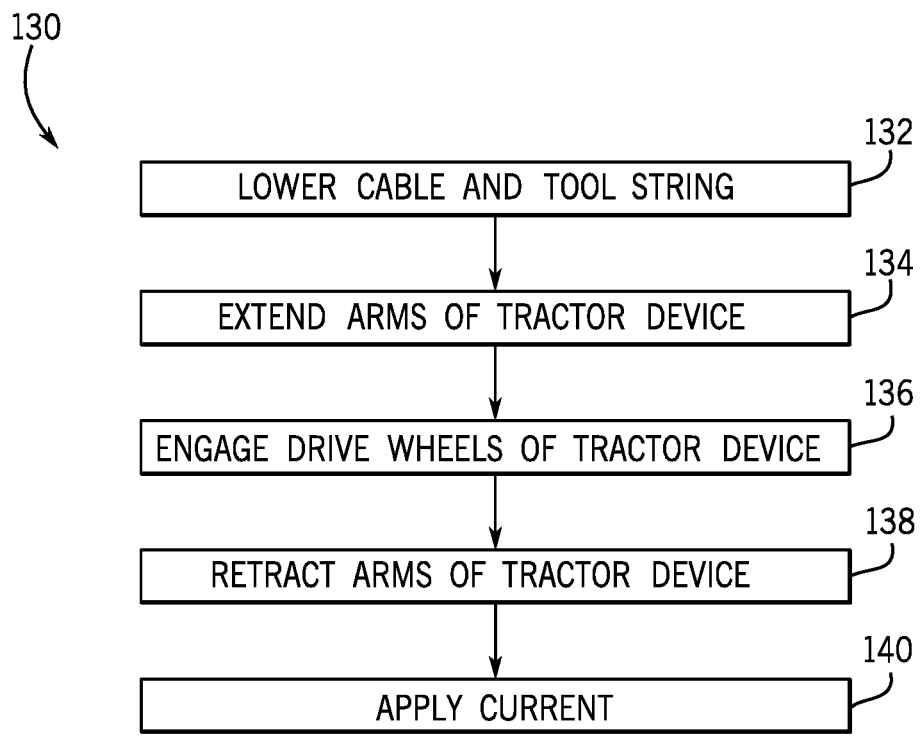
FIG. 4 is a flow chart for a method for lowering the toolstring and holding the cable against the casing of the wellbore, in accordance with an aspect of the present disclosure.

FIG. 4 illustrates a flowchart of a method 130 for improving the signal to noise ratio. The method 130 includes lowering (block 132) the cable 18 and the toolstring 12 into the wellbore 16, initially by gravity. The method 130 includes extending (block 134) the arms 124 of the tractor device 122. The method 130 includes engaging (block 136) the drive wheels 126 of the tractor device 122. The drive wheels 126 may be engaged against a surface of the wellbore 16, thereby propelling the toolstring 12 deeper into the wellbore 16. The method 130 includes retracting (block 138) the arms 124 of the tractor device 122. The method 130 includes applying (block 140) current to the magnetic strength members 72 or 94 of the cable 18. As previously discussed, applying current to the magnetic strength members 72 or 94 allows the cable 18 to function as an electromagnet. The cable 18 may then be pulled taught to keep the cable 18 steady while the fiber optic cables transmit data. The cable 18 being kept steady reduces the signal to noise ratio of the data transmitted through the fiber optic cables.

FIG. 5A is a side view of an embodiment of a toolstring 12B including a timer-activated magnetic device 170 with the arms 164 of the tractor device 162 extended. The timer-activated magnetic device 170 is powered by a battery 174 and the timer-activated device 170 is located in the toolstring 12B. Before running the toolstring 12B and cable 18 into the wellbore 16, the timer 172 is set to activate after allowing sufficient time for the cable 18 to run into the wellbore 16 to the desired location. The cable 18 and the toolstring 12 are lowered into the wellbore 16 on the cable 18, initially by gravity. A tractor device 162 attached to the toolstring 12 is used to continue running the toolstring 12 into the wellbore 16 in substantially horizontal portions of the wellbore 16. The current returned through the armor can be used to store energy in the battery 174 and extend the magnetic anchoring period. As depicted in FIG. 5B, the tractor device 162 uses drive wheels 166 on arms 164 that extend from the toolstring 12B to propel the toolstring 12B down the casing 40 of the wellbore 16.

Figure 5C:
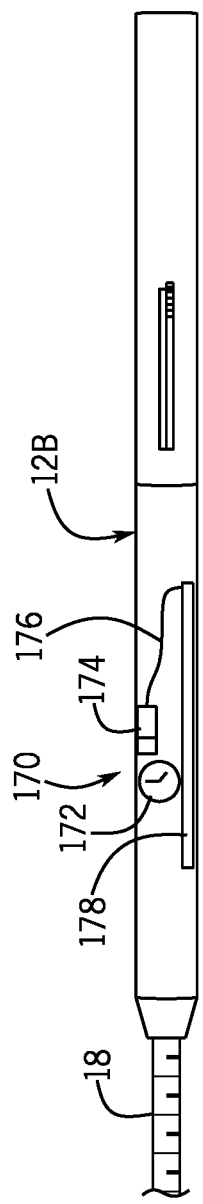
FIG. 5C is a side view of the toolstring of FIG. 5A with the arms of the tractor device retracted, in accordance with an aspect of the present disclosure.
Figure 5D:
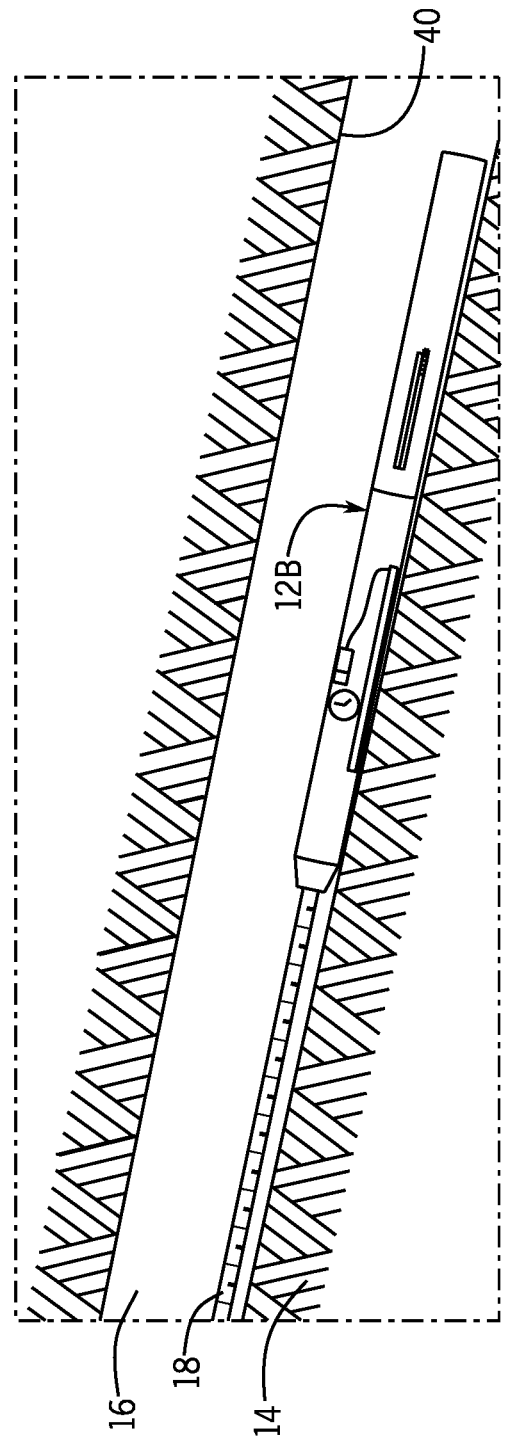
FIG. 5D is a side view of the toolstring of FIG. 5C in a wellbore and with the selectively magnetic device holding the toolstring to the casing of the wellbore, in accordance with an aspect of the present disclosure.
Figure 5E:
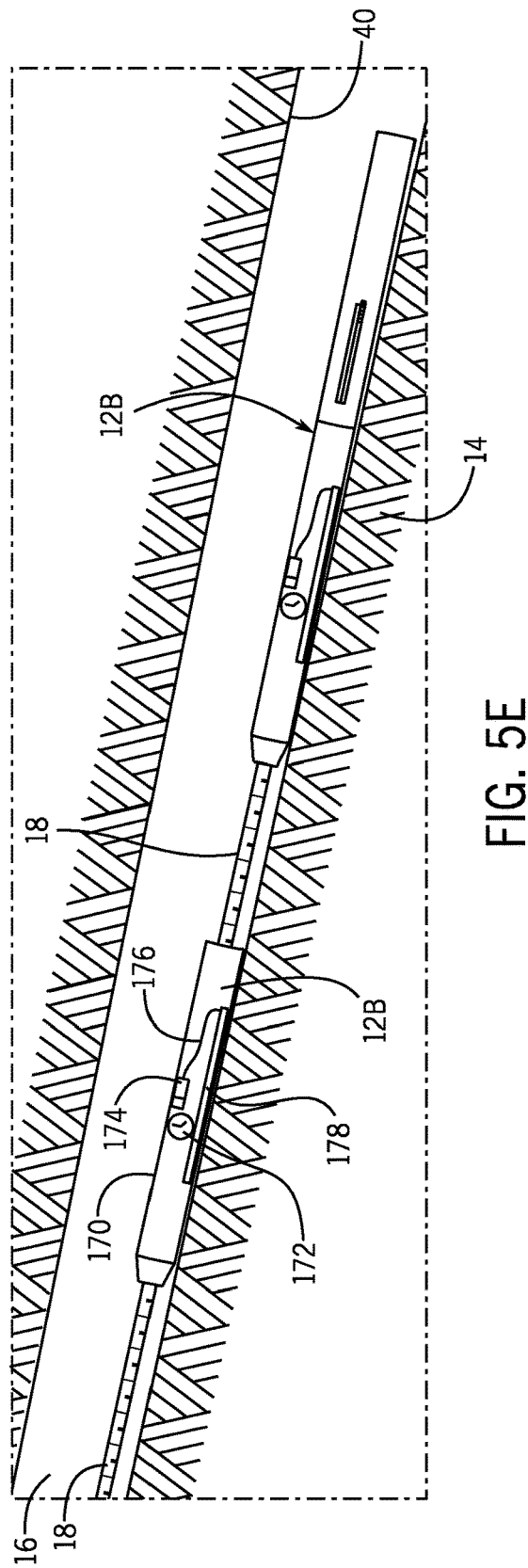
FIG. 5E is a side view of the toolstring of FIG. 5D, with an additional toolstring mounted on the cable, in accordance with an aspect of the present disclosure.

FIGS. 5C and 5D are side views of the toolstring 12B with the arms 164 of the tractor device 162 retracted. Once the timer 172 reaches the end of its time, the timer 172 activates a switch 176 of the timer-activated magnetic device 170 (which will allow time for the toolstring 12B to arrive at the desired downhole location). Activating the switch 176 supplies power from the battery 174 to the electromagnet 178. Activating the switch 176 also causes the drive wheels 166 of the tractor device 162 to retract into the toolstring 12B. The electromagnet 178 holds the toolstring 12B in place against the casing 40 of the wellbore 16. The cable 18 can then be tightened to hold it taut against the casing 40 of the wellbore 16, allowing the fiber optics of the cable 18 to transmit a strong and consistent signal from downhole formations. FIG. 5E is a side view of the toolstring 12B of FIG. 5D, with a second timer-activated magnetic device 170 mounted on the cable 18. Multiple timer-activated magnetic devices 170 may be located at any suitable location along the length of the cable 18.

Figure 6:
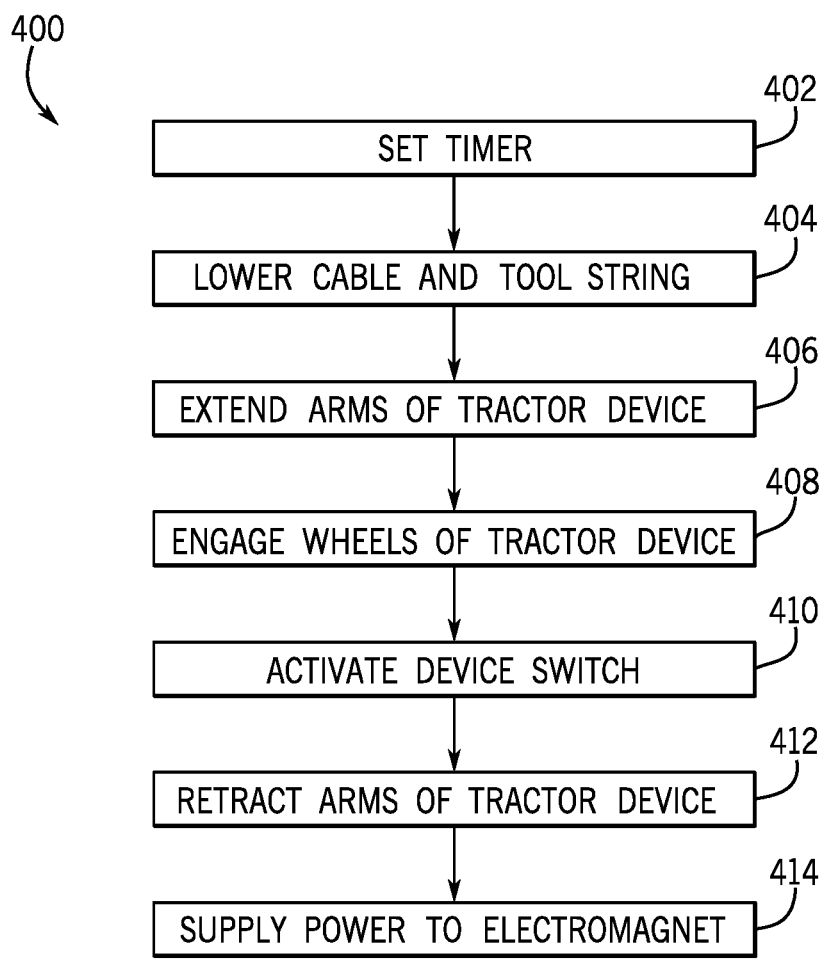
FIG. 6 is a flow chart for a method for lowering the toolstring and holding the cable against the casing of the wellbore using a timer device, in accordance with an aspect of the present disclosure.

FIG. 6 illustrates a flowchart of a method 400 for improving the signal to noise ratio. The method 400 includes setting (block 402) the timer 172 of the timer-activated magnetic device 170. The method 400 includes lowering (block 404) the cable 18 and the toolstring 12 into the wellbore 16, initially by gravity. The method 400 includes extending (block 406) the arms 164 of the tractor device 162. The method 400 includes engaging (block 408) the drive wheels 166 of the tractor device 162. The drive wheels 166 may engage a surface of the wellbore 16, thereby driving the toolstring 12 deeper into the wellbore 16. The method 400 includes activating (block 410) the switch 176 of the timer-activated magnetic device 170. The method 400 includes retracting (block 412) the arms 164 of the tractor device 162. The method 400 includes supplying (block 414) power to the electromagnet 178. In the present embodiment, the power is supplied by a battery 174, but the power may be supplied from other structure, including the cable 18. Supplying power to the electromagnet 178 causes the electromagnet 178 to attach to the casing 40 of the wellbore 16. The cable 18 may then be pulled taught to keep the cable 18 steady while the fiber optic cables transmit data. The cable 18 being kept steady reduces the signal to noise ratio of the data transmitted through the fiber optic cables.

Figure 7A:
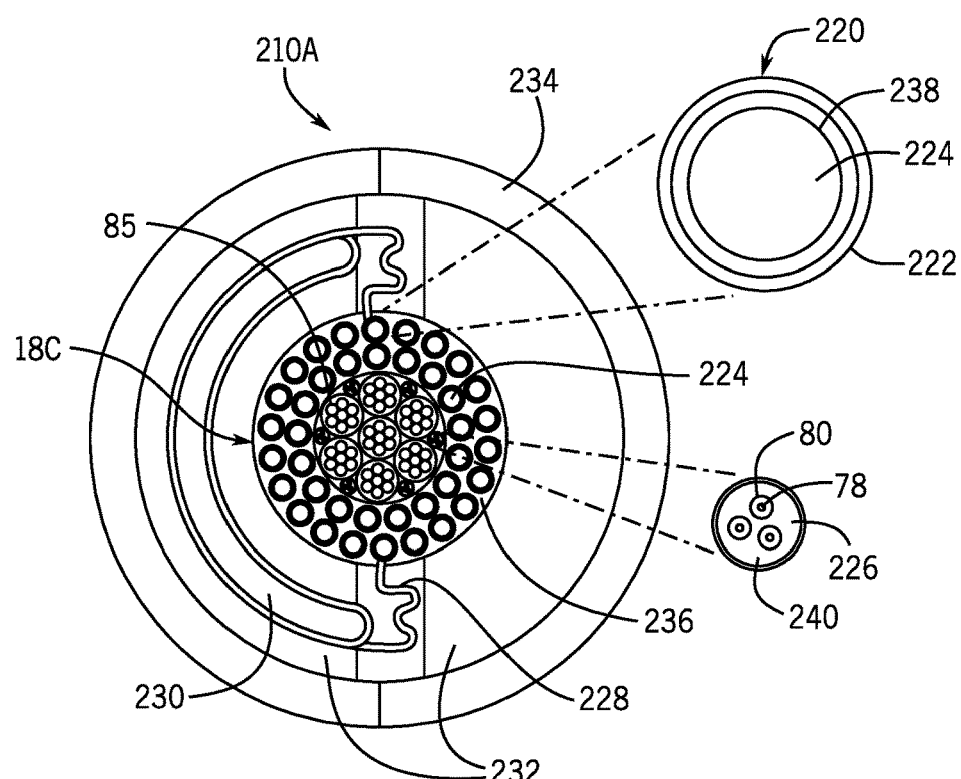
FIGS. 7A-7B are cross sections of different embodiments of the cable with a magnetic device coupled to the cable, in accordance with an aspect of the present disclosure.

FIG. 7A is a cross section of an embodiment of a cable 18C with a magnetic device 210A coupled to the cable 18C. The magnetic device 210A is installed as needed along the cable 18C and is powered by insulated magnetic strength members 220. Insulated magnetic strength members 220 include insulation 222 (e.g., durable polymetric electrical insulation). A number of strength members 224 are replaced by insulated magnetic strength members 220. Insulated magnetic strength members 220 can be made out of bimetallic material or any suitable magnetic material. A separate insulated magnetic strength member 220 may be used for each magnetic device 210A so that each magnetic device 210A may be operated independently. The magnetic device 210A is installed over the cable 18C in two halves that come together and are held together by a magnetic device casing 234 to form a cylinder. The cable 18C includes a cable core 236, strength members 224, and insulated magnetic strength members 220. The cable core 236 may include fiber optic cables 81 and conductors 85. The fiber optic cables 81 may include an optical core 78 and an insulating coating 80 followed by a second insulating coating 226 and an outer insulating layer 240. One side of the cylinder contains an electromagnet 230. The electromagnet 230 is a semi-circular-profile iron bar wrapped tightly in insulated copper wire. Non-conductive spacers 232 hold the electromagnet 230 in place within the gap between the magnetic device casing 234 and the cable 18C. One end of an insulated conductive wire 228 is attached to the insulated magnetic strength member 220, and the other end is attached to the electromagnet 230. Sufficient slack is allowed in the insulated conductive wires 228 to enable the connections to insulated magnetic strength members 220 that tend to rotate under longitudinal stress. When current is applied to the insulated magnetic strength members 220, the electromagnet 230 is activated and attaches the magnetic device 210A to the casing 40 of the wellbore 16.

Figure 7B:
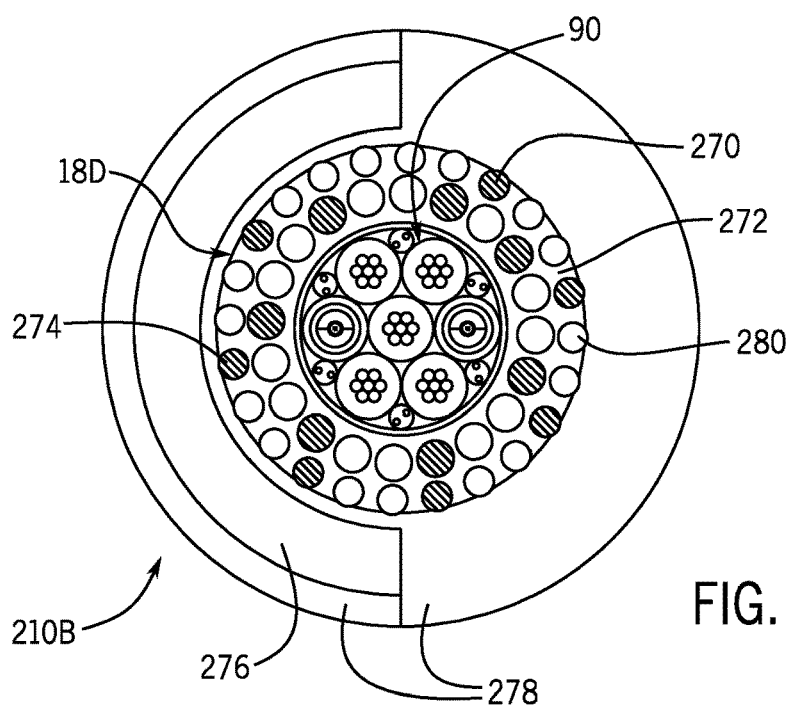

FIG. 7B is a cross section of an embodiment of a cable 18D with a magnetic device 210B coupled to the cable 18D. The cable 18D includes the cable core 90, insulated magnetic strength members 270, strength members 280, and a filler material 272 (e.g., an insulating material). The magnetic device 210B is installed along the cable 18D and powered by insulated magnetic strength members 270. A number of strength members 280 (e.g., standard armor wire) are replaced by the insulated magnetic strength members 270. The insulated magnetic strength members 270 may be made out of bimetallic material or any suitable magnetic material to increase the force of attraction between magnetic device 210B and casing 40 of the wellbore 16. The magnetic device 210B is installed over the cable 18D in two halves that come together to form a cylinder. One side contains an electromagnet 276. Spacers 278 hold the electromagnet 276 in place on the cable 18D. When current is applied to the insulated magnetic strength members 270, the electromagnet 276 is activated and attaches the magnetic device 210B to the casing 40 of the wellbore 16.

FIGS. 8A and 8B are a side view of the magnetic device 210. The magnetic device 210 may include either the magnetic device 210A or 210B. As shown in FIG. 8B, the cable 18 may include multiple magnetic devices 210. The magnetic devices 210 may be spread along the cable 18 at any distance as is desired. FIG. 8C is a side view of the magnetic devices 210 attached to the casing 40 of the wellbore 16. Once the magnetic device 210 has advanced to the desired location in the well, current is applied as described above to activate the electromagnet 230 or 276. The magnetic device 210 attaches magnetically to the casing 40 of the wellbore 16. The cable 18 is pulled taut and any other magnetic devices 210 are also activated to hold the cable 18 against the casing 40 of the wellbore 16. The cable 18 can then be tightened to hold it taut against the casing 40 of the wellbore 16, thereby allowing the fiber optics of the cable to receive a strong and consistent signal from downhole formations. Pressing the cable 18 against the casing 40 of the wellbore 16 may also press the toolstring 12 against the casing 40.

FIG. 9A is a side view of an embodiment of a toolstring 12C including an anchoring device 310 and a tractor device 290 and the arms 292 of the tractor device 290 are extended. The present embodiment includes two toolstrings 12C, and only one of the toolstrings includes the tractor device 290. The cable 18 and the toolstring 12C are lowered into the wellbore 16, initially by gravity. The tractor device 290 of the toolstring 12C is used to continue running the toolstring 12C into the wellbore 16 in substantially horizontal portions of the well. Once the toolstring 12C is at the desired location, the drive wheels 294 of the tractor device 290 retract.

FIG. 9B is a side view of the toolstring 12C with the anchoring device 310 activated. FIG. 9C is a side view of two toolstrings 12C, both with the anchoring device 310 activated. The anchoring devices 310 in the toolstring 12C are activated by telemetry signals sent through the cable 18 from the surface. The telemetry signals cause a switch 318 to either engage or disengage. The telemetry signals cause the switch 318 to engage once the toolstring 12C has reached the desired location in the wellbore 16. However, while the switch 318 is engaged or disengaged by telemetry signals in the present embodiment, it should be noted that the switch 318 may be engaged or disengaged by a program designed to engage the switch 318 after a sufficient amount of time has passed. The anchoring devices 310 have a single side-arm 312 that deploys in direction 314 to anchor the toolstrings 12C and the cable 18 to the casing 40 of the wellbore 16 when the switch 318 is engaged. The side-arm 312 of the anchoring device 310 swings outward about a hinge 320 in the direction 314 to wedge the toolstring 12C in place against the casing 40 of the wellbore 16. In the present embodiment, the anchoring device 310 is powered by a battery 316; however, it should be appreciated that the anchoring device 310 may also be powered by power supplied through the cable 18.

Figure 10:
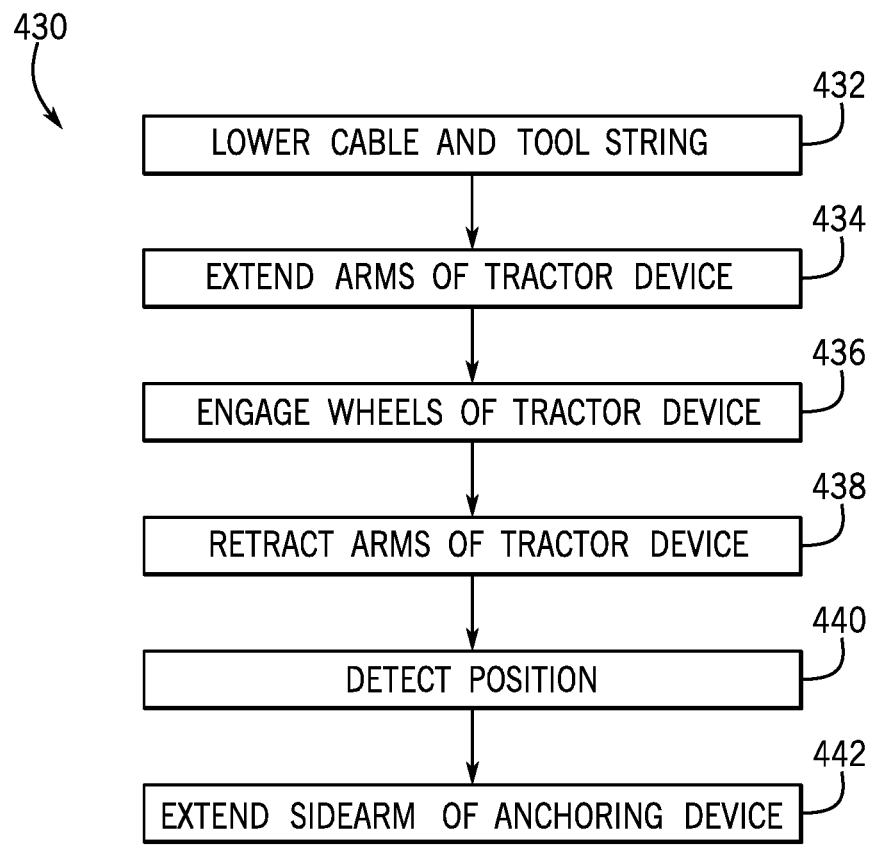
FIG. 10 is a flow chart for a method for lowering the toolstring and holding the cable against the casing of the wellbore using an anchoring device, in accordance with an aspect of the present disclosure.

FIG. 10 illustrates a flowchart of a method 430 for improving the signal to noise ratio. The method 430 includes lowering (block 432) the cable 18 and the toolstring 12 into the wellbore 16, initially by gravity. The method 430 includes extending (block 434) the arms 292 of the tractor device 290. The method 430 includes engaging (block 436) the drive wheels 294 of the tractor device 290. The drive wheels 294 may be engaged against a surface of the wellbore 16, thereby driving the toolstring 12 deeper into the wellbore 16. The method 430 includes retracting (block 438) the arms 292 of the tractor device 290. Then, the method 430 includes detecting (block 440) the position of the toolstring 12 using telemetry signals. The method 430 includes extending (block 442) the side-arm 312 of the anchoring device 310. Extending the side-arm 312 wedges the toolstring 12 against the casing 40 of the wellbore 16.

Figure 11A:
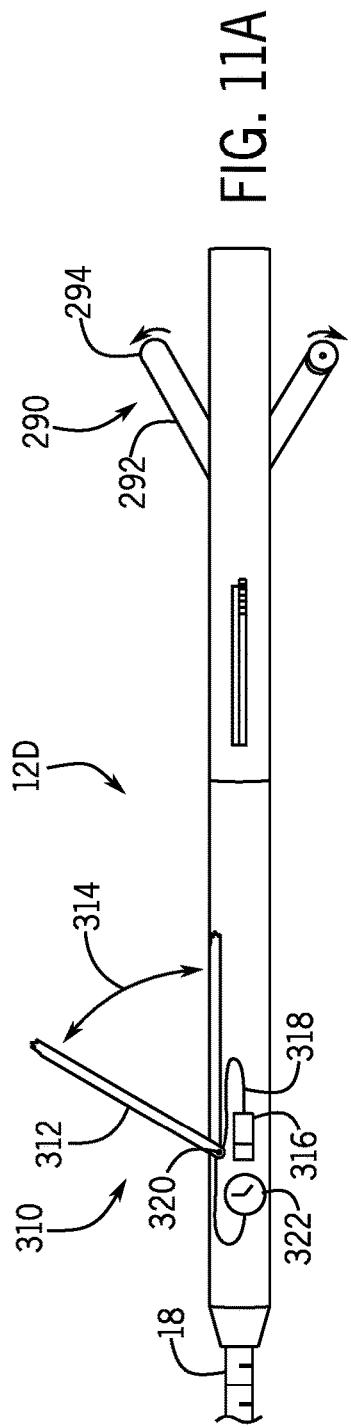
FIG. 11A is a side view of the toolstring of FIG. 9A where the anchoring device is activated by a timer device, in accordance with an aspect of the present disclosure.
Figure 11B:
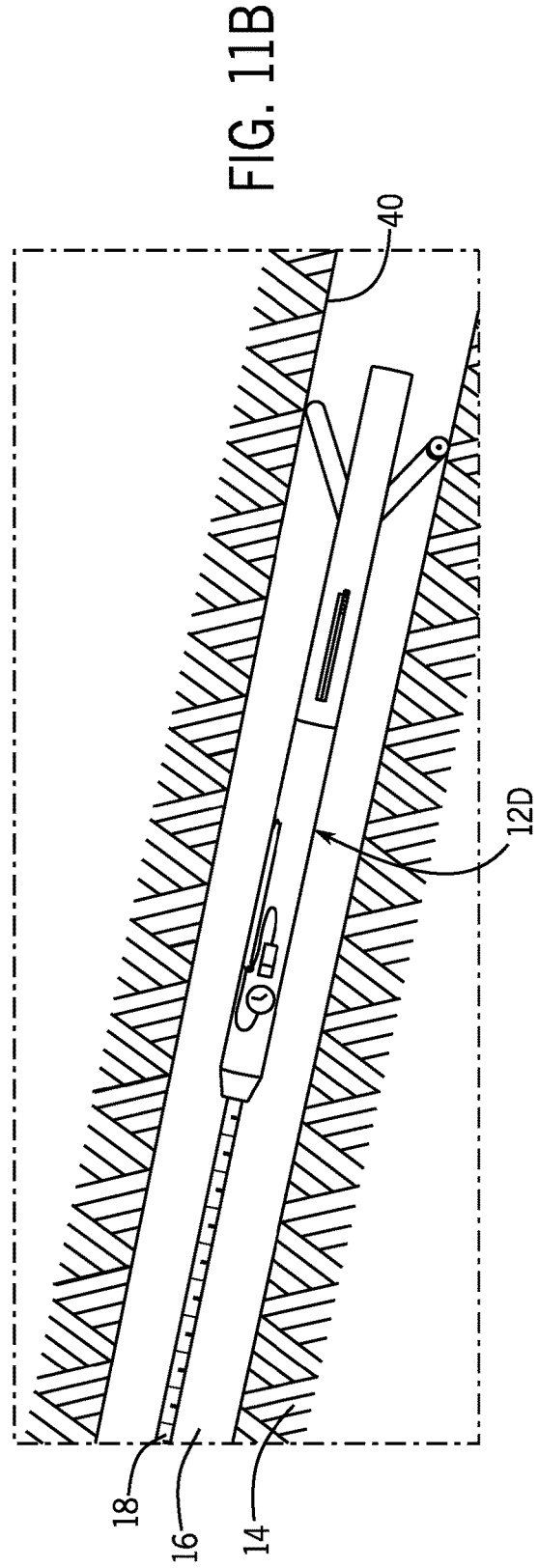
FIG. 11B is a side view of the toolstring of FIG. 11B in a wellbore and with the arms of the tractor device extended, in accordance with an aspect of the present disclosure.

FIG. 11A is a side view of the toolstring 12C of FIG. 9A where the anchoring device 310 is activated by a timer device 322. FIG. 11B is a side view of the toolstring 12D of FIG. 11A in the wellbore 16. The toolstring 12D uses a timer-activated, battery-powered anchoring device 310 on the toolstring 12D with a single side-arm 312 that deploys to anchor the toolstring 12D in place against the casing 40 of the wellbore 16. Before running into the wellbore 16, the timer device 322 is set to activate after allowing sufficient time for the cable 18 to run into the wellbore 16 to the desired location. The cable 18 and the toolstring 12D are lowered into the wellbore 16 on a cable 18, initially by gravity. A tractor device 290 attached to the toolstring 12D is used to continue running the toolstring 12D into the wellbore 16 in substantially horizontal portions of the wellbore 16. Once the toolstring 12D is in place in the desired location, the timer device 322 activates the switch 318. Activating the switch 318 causes the drive wheels 294 of the tractor device 290 to retract and the anchoring device 310 to activate. The side-arm 312 of the anchoring device 310 swings outward to wedge the toolstring 12D in place against the casing 40 of the wellbore 16.

Figure 12:
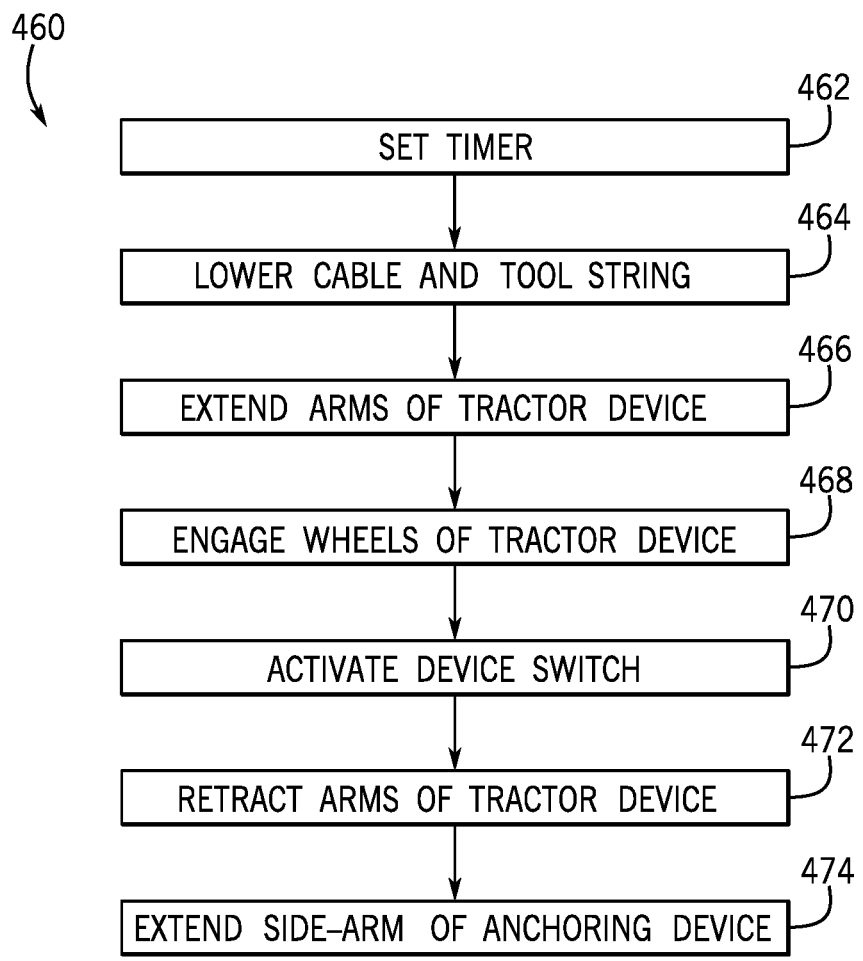
FIG. 12 is a flow chart for a method for lowering the toolstring and holding the cable against the casing of the wellbore using a timer device, in accordance with an aspect of the present disclosure.

FIG. 12 illustrates a flowchart of a method 460 for improving the signal to noise ratio. The method 460 includes setting (block 462) the timer device 322 of the anchoring device 310. The method 460 includes lowering (block 464) the cable 18 and the toolstring 12 into the wellbore 16, initially by gravity. The method 460 includes extending (block 466) the arms 292 of the tractor device 290. The method 460 includes engaging (block 468) the drive wheels 294 of the tractor device 290. The drive wheels 294 may be engaged against a surface of the wellbore 16, thereby driving the toolstring 12 deeper into the wellbore 16. The method 460 includes activating (block 470) the switch 318 of the timer-activated anchoring device 310. The method 460 includes retracting (block 472) the arms 292 of the tractor device 290. The method 460 includes extending (block 474) the side-arm 312 of the anchoring device 310. Extending the side-arm 312 wedges the toolstring 12 against the casing 40 of the wellbore 16.

With the foregoing in mind, embodiments presented herein provide devices that are capable of improving the signal to noise ratio of measurements. First, a device may aid in propelling a toolstring to the desired location within the wellbore. Once the toolstring has reached the desired location, another device may be utilized to hold the toolstring steady and in place. Keeping the toolstring steady enables sensors to make more accurate measurements by improving the signal to noise ratio of measurements (e.g., by pressing the toolstring against the wellbore wall and/or by maintaining a taut cable that can transmit fiber optic signals with fewer turns or kinks).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system comprising:
   a cable;
   a magnetic device having two halves with one half including an electromagnet, where the two halves come together to form a cylinder over the cable; and
   a toolstring configured to be coupled to the cable, wherein the toolstring is configured to be placed in a wellbore, wherein the toolstring comprises a sensor configured to obtain measurements within the wellbore;
   wherein the cable or the toolstring, or both, comprise an electromagnetic device configured to selectively hold the toolstring or the cable, or both, against a surface of the wellbore.

2. The system of claim 1, wherein the electromagnet is coupled directly to the toolstring.

3. The system of claim 1, wherein the electromagnet is powered by the cable.

4. The system of claim 3, wherein the magnetic device is powered by insulated magnetic strength members of the cable.

5. The system of claim 1, wherein the toolstring comprises a tractor device.

6. The system of claim 1, wherein spacers hold the electromagnet in place on the cable.

7. The system of claim 1, wherein the cable includes a plurality of magnetic devices, where each magnetic device of the plurality of magnetic devices is spaced apart from an adjacent magnetic device.

8. A method for improving a signal to noise ratio of a signal provided over a cable by a toolstring, comprising:
   lowering the cable and the toolstring into a wellbore;
   extending at least one arm of a tractor device coupled to the toolstring, wherein the at least one arm comprises a wheel;
   engaging the wheel of the tractor device against a surface of the wellbore, wherein engaging the wheel of the tractor device propels the toolstring and the cable into the wellbore;
   retracting the at least one arm of the tractor device, wherein retracting the at least one arm disengages the wheel from the surface of the wellbore; and
   attaching the toolstring to the surface of the wellbore using a magnetic device coupled to the toolstring;
   wherein the magnetic device comprises two halves with one half including an electromagnet, where the two halves come together to form a cylinder over the cable.

9. The method of claim 8, comprising setting a timer before lowering and activating a device switch, wherein activating the device switch attaches the toolstring to the surface of the wellbore.

10. The method of claim 8, wherein supplying power to the electromagnet activates the electromagnet, wherein activating the electromagnet attaches the toolstring to the surface of the wellbore.

11. The method of claim 8, comprising detecting a position of the toolstring with telemetry signals and activating a device switch based on telemetry signals, wherein activating the device switch attaches the toolstring to the surface of the wellbore.

* * * * *